United States Patent
Von Behr et al.

(10) Patent No.: US 7,557,688 B2
(45) Date of Patent: Jul. 7, 2009

(54) HOUSING CONFIGURATION FOR A PYROMECHANICAL DISCONNECTING DEVICE

(75) Inventors: Diedrich Von Behr, Erlangen (DE); Uwe Brede, Fuerth (DE); Gerhard Kordel, Nuernberg-Kornburg (DE); Juergen Neuser, Massenbachhausen (DE); Wolfgang Seitz, Leingarten (DE); Juergen Knauss, Obermichelbach (DE)

(73) Assignees: Delphi Technologies, Inc., Troy, MI (US); Gessmann GmbH & Co. KG

( * ) Notice: Subject to any disclaimer, the term of this patent is extended or adjusted under 35 U.S.C. 154(b) by 257 days.

(21) Appl. No.: 10/551,336

(22) PCT Filed: Apr. 26, 2004

(86) PCT No.: PCT/EP2004/004377

§ 371 (c)(1),
(2), (4) Date: Sep. 14, 2006

(87) PCT Pub. No.: WO2004/097877

PCT Pub. Date: Nov. 11, 2004

(65) Prior Publication Data

US 2007/0069846 A1      Mar. 29, 2007

(30) Foreign Application Priority Data

Apr. 30, 2003   (DE) ............................. 103 19 750
Mar. 5, 2004    (DE) ...................... 10 2004 010 745

(51) Int. Cl.
  *H01H 71/20*   (2006.01)
  *H01H 73/24*   (2006.01)
(52) U.S. Cl. .................. 337/157; 337/30; 337/401; 337/405; 361/115; 200/61.08
(58) Field of Classification Search .................. 337/30, 337/157, 401, 405; 361/115; 200/61.08
See application file for complete search history.

(56) References Cited

U.S. PATENT DOCUMENTS 2,924,147 A      2/1960   Rudolph et al.
2,931,874 A  *   4/1960   Leaman ..................... 337/406

(Continued)

FOREIGN PATENT DOCUMENTS

DE             4438157 C1  *  12/1995

(Continued)

OTHER PUBLICATIONS

European Search Report dated Aug. 5, 2004.

*Primary Examiner*—Anatoly Vortman
(74) *Attorney, Agent, or Firm*—Douglas D. Fekete

(57) ABSTRACT

A pyromechanical disconnecting device that includes a housing having a receiving space for an ignition element and a supporting floor. A disconnecting tool is disposed in the housing and movable along a path toward a disconnecting point of a current conductor rail. Also disposed in the housing is an ignition element adapted to propel the disconnecting tool along the path to sever the current conductor rail. The ignition element includes an end having a conical flank facing the supporting floor of the housing. An elastic sealing element is arranged about the conical flank and the supporting floor to act as an axial tolerance compensator between the ignition element and the supporting floor of the housing.

5 Claims, 1 Drawing Sheet

U.S. PATENT DOCUMENTS

| | | | |
|---|---|---|---|
| 4,150,266 A * | 4/1979 | Patrichi | 200/61.08 |
| 4,224,487 A | 9/1980 | Simonsen | |
| 4,417,519 A * | 11/1983 | Lutz | 102/263 |
| 5,070,787 A * | 12/1991 | Weldon et al. | 102/216 |
| 5,535,842 A * | 7/1996 | Richter et al. | 180/279 |
| 5,877,563 A * | 3/1999 | Krappel et al. | 307/10.1 |
| 6,232,568 B1 * | 5/2001 | Hasegawa et al. | 200/61.08 |
| 6,295,930 B1 * | 10/2001 | Kume et al. | 102/202.5 |
| 6,556,119 B1 * | 4/2003 | Lell | 337/157 |
| 7,063,019 B2 * | 6/2006 | Parks et al. | 102/202.9 |
| 7,123,124 B2 * | 10/2006 | Caruso et al. | 337/157 |
| 2005/0034595 A1 * | 2/2005 | Kordel et al. | 89/1.14 |

FOREIGN PATENT DOCUMENTS

| | | |
|---|---|---|
| DE | 19712387 A1 * | 10/1997 |
| DE | 197 32 650 | 2/1999 |
| DE | 102 03 710 | 2/2003 |
| DE | 20315849 U1 * | 3/2004 |
| EP | 725412 A2 * | 8/1996 |

\* cited by examiner

HOUSING CONFIGURATION FOR A PYROMECHANICAL DISCONNECTING DEVICE

TECHNICAL FIELD OF INVENTION

This invention relates to a pyromechanical disconnecting device.

BACKGROUND OF INVENTION

The invention relates to a pyromechanical disconnecting device, in particular for switching off a battery in a motor vehicle, with a housing in which a current conductor rail is arranged, constructed as able to be cut through by a disconnecting tool at a disconnecting point, wherein the disconnecting tool can be accelerated by the propellants of an ignition element and the ignition element has electrical connecting pins, is inserted into a receiving space in the housing and is supported on a supporting floor of this receiving space and the supporting floor has through bores for the connecting pin.

With disconnecting devices of this kind it is known also to insert into the housing a supporting element, which has a supporting function for absorbing the back pressure during triggering of the ignition element. This supporting element usually consists of metal.

According to the prior art this supporting element is inserted into an injection mould for the housing as an insertion part and injected with the housing. This process is cost-intensive, as the insertion process is usually done by hand. Additionally there are the costs for the insertion part itself.

SUMMARY OF THE INVENTION

The object of the invention is to enable simple and yet safe installation of an ignition element into the pyromechanical disconnecting device.

According to the invention this object is achieved in that an elastic sealing element is arranged between the ignition element and the supporting floor. This sealing element acts as axial tolerance compensation for the ignition element and at the same time represents a sealing function against the penetration of moisture.

In one embodiment the supporting element is an O-ring. Alternatively, the sealing element may also be a flat seal, which is arranged on the supporting floor and through which the connecting pins project.

In a further embodiment the sealing element is an elastic compensation element injected on to the supporting floor.

The housing consists of a high-strength insulating material, preferably a plastics material, with which glass fibres or carbon fibres may be mixed for mechanical stiffening.

The invention is explained in greater detail below using three figures.

DETAIL DESCRIPTION OF THE INVENTION

Figure 1:
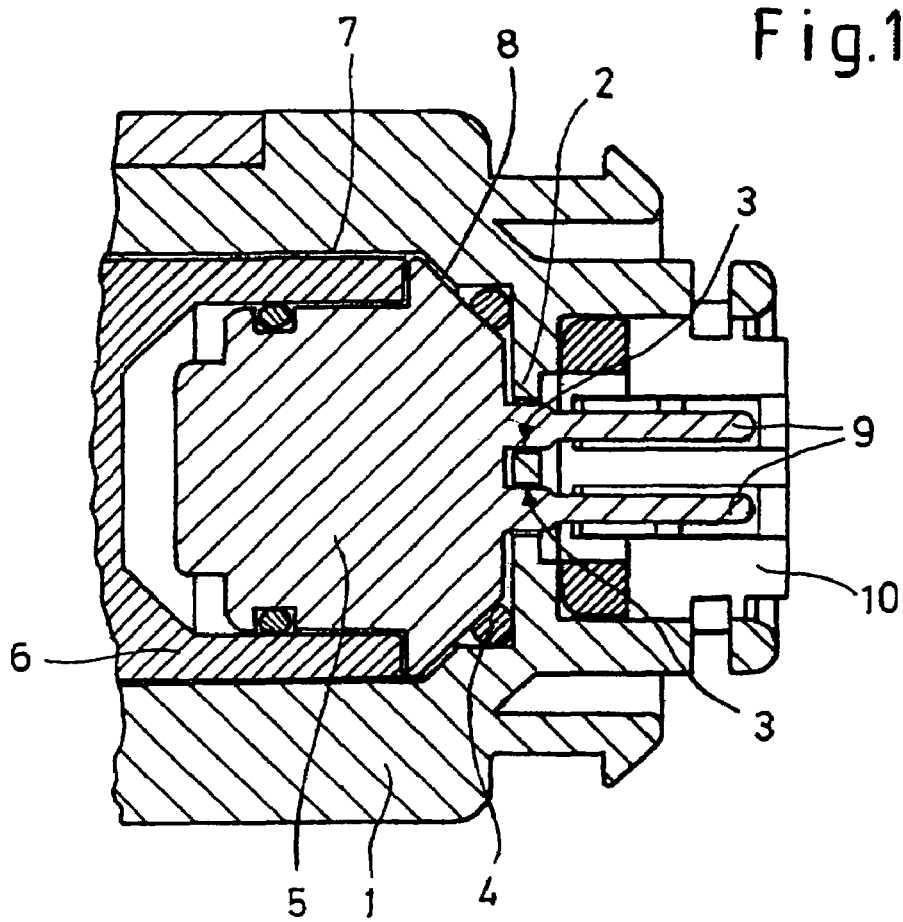
FIG. 1 shows a detail from a pyromechanical disconnecting device which can be used for switching off the battery in a motor vehicle.

In a housing 1 made of a high-strength insulating material, with which glass fibres or carbon fibres are mixed for stiffening, a receiving space 7 is arranged, in which there is an ignition element 5, which on initiation generates a propellant. This propellant accelerates a disconnecting tool 6, which in turn cuts through a current conductor rail (not shown), arranged in the housing 1 or in the receiving space 7, at a disconnecting point.

The ignition element 5 is supported on a supporting floor 2 of the receiving space 7, the ignition element 5 having two connecting pins 9, which project through the supporting floor 2 at two through bores 3. The connecting pins 9 are connected from outside to a plug 10.

Between the ignition element 5 and the supporting floor 2 is arranged an elastic sealing element 4, which acts as axial tolerance compensation for the inserted ignition element 5. At the same time this sealing element 4 represents a sealing function against penetration of moisture.

As shown in FIG. 1, this sealing element 4 is an O-ring which is supported on a conical flank 8 of the ignition element 5 and the supporting floor 2.

Figure 2:
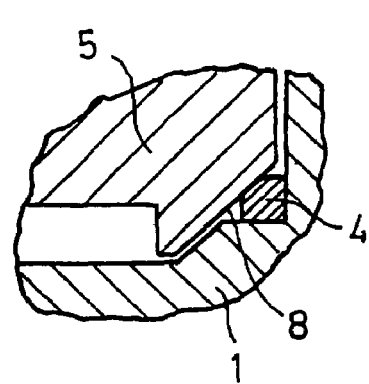
FIG. 2 shows a detail view of an alternative embodiment of the elastic element positioned between the conical flank of the ignition element and supporting floor.

In FIG. 2 an embodiment of the elastic sealing element 4 is shown, in which the sealing element 4 is an elastic compensation element injected on to the supporting floor 2. This compensation element, like the O-ring shown in FIG. 1, is supported on a conical flank 8 of the ignition element 5.

Figure 3:
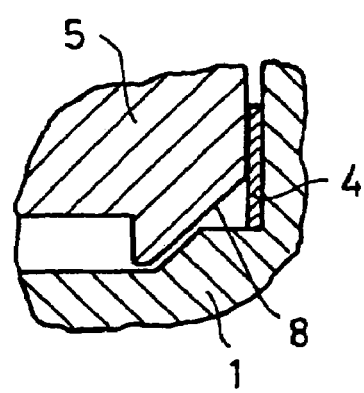
FIG. 3 show a detail view of yet an other alternative embodiment of the elastic element positioned between the conical flank of the ignition element and supporting floor.

FIG. 3 shows an embodiment of the sealing element 4, in which the sealing element 4 is a flat seal which is arranged on the supporting floor 2 and through which the connecting pins 9 of the ignition element 5 project.

The invention claimed is:

1. A pyromechanical disconnecting device comprising
a housing defining a receiving space and a supporting floor having a bore there through,
a current conductor rail having a disconnecting point and arranged in said housing,
a disconnecting tool in said housing and movable along a path toward said disconnecting point to sever said current conductor rail,
an ignition element adapted to propel said disconnecting tool along said path to sever said current conductor rail, wherein said ignition element is disposed in said receiving space and adjacent to said supporting floor, said ignition element including an end facing said supporting floor, a conical flank about said end, and a connecting pin extending from said end through said bore,
an elastic sealing element arranged between said conical flank and said supporting floor and effective to space said end apart from said supporting floor.

2. A pyromechanical disconnecting device of claim 1, wherein said elastic sealing element is an O-ring.

3. A pyromechanical disconnecting device of claim 1, wherein said elastic sealing element is a flat seal which is arranged on said supporting floor.

4. A pyromechanical disconnecting device of claim 1, wherein said elastic sealing element is an elastic compensation element injected on to said support floor.

5. A pyromechanical disconnecting device of claim 2, wherein said housing consists of a plastic material with which glass fibres or carbon fibres are mixed for mechanical stiffening.

* * * * *